(12) United States Patent
Markham (10) Patent No.: US 10,759,595 B2
(45) Date of Patent: Sep. 1, 2020

(54) ROLL-OFF TRANSPORT BARREL WITH GRAVITY, VACUUM, AND PNEUMATIC LOADING AND UNLOADING

(71) Applicant: The Modern Group, Ltd., Beaumont, TX (US)

(72) Inventor: Gary R. Markham, Lumberton, TX (US)

(73) Assignee: The Modern Group, Ltd., Beaumont, TX (US)

( * ) Notice: Subject to any disclaimer, the term of this patent is extended or adjusted under 35 U.S.C. 154(b) by 683 days.

(21) Appl. No.: 15/449,270

(22) Filed: Mar. 3, 2017

(65) Prior Publication Data

US 2018/0251291 A1 Sep. 6, 2018

(51) Int. Cl.
| B65D 88/54 | (2006.01) |
| B65D 88/12 | (2006.01) |
| B65D 88/28 | (2006.01) |
| B65D 88/30 | (2006.01) |
| B60P 3/22 | (2006.01) |
| B65D 90/18 | (2006.01) |
| B65D 90/16 | (2006.01) |

(52) U.S. Cl.
CPC .......... *B65D 88/548* (2013.01); *B60P 3/2245* (2013.01); *B65D 88/128* (2013.01); *B65D 88/129* (2013.01); *B65D 88/28* (2013.01); *B65D 88/30* (2013.01); *B65D 88/546* (2013.01); *B65D 90/16* (2013.01); *B65D 90/18* (2013.01)

(58) Field of Classification Search
CPC .... B60P 1/6427; B60P 1/6463; B65D 88/128; B65D 88/129; B65D 88/28; B65D 88/30; B65D 88/546; B65D 88/548; B65D 90/16
See application file for complete search history.

(56) References Cited

U.S. PATENT DOCUMENTS

| 3,917,354 | A | * | 11/1975 | Adams, Jr. | ........... | B65D 88/548 |
| | | | | | | 406/128 |
| 7,540,695 | B2 | * | 6/2009 | Snowdon | ............. | B65D 88/128 |
| | | | | | | 406/119 |
| 8,529,160 | B2 | * | 9/2013 | Ambriz | .................. | B65D 88/26 |
| | | | | | | 406/151 |
| 8,585,341 | B1 | * | 11/2013 | Oren | ........................ | B65D 7/00 |
| | | | | | | 414/411 |
| 8,985,376 | B2 | * | 3/2015 | Musso | ................. | B65D 88/027 |
| | | | | | | 220/501 |
| 9,428,330 | B2 | * | 8/2016 | Lopez | .................. | B65D 88/027 |
| 9,637,320 | B2 | * | 5/2017 | Moretto | ................ | B65G 43/08 |
| 9,718,610 | B2 | * | 8/2017 | Oren | ..................... | B65D 88/30 |
| 10,202,236 | B2 | * | 2/2019 | Polacek | .............. | B65D 88/741 |
| 2007/0059133 | A1 | * | 3/2007 | Kim | ........................ | B60P 1/003 |
| | | | | | | 414/462 |
| 2007/0166139 | A1 | * | 7/2007 | Reed, III | .............. | B60P 1/6463 |
| | | | | | | 414/491 |
| 2014/0166647 | A1 | * | 6/2014 | Sheesley | ................ | B65D 90/66 |
| | | | | | | 220/1.5 |

(Continued)

FOREIGN PATENT DOCUMENTS

WO WO-0100509 A2 * 1/2001 ............. B65G 53/12

*Primary Examiner* — James Keenan
(74) *Attorney, Agent, or Firm* — Adolph Locklar (57) ABSTRACT

A barrel is capable of vacuum loading and unloading, gravity unloading and loading, and pneumatic unloading. A roll-off skid is coupled to the barrel.

12 Claims, 6 Drawing Sheets

(56) References Cited

U.S. PATENT DOCUMENTS

| | | | |
|---|---|---|---|
| 2014/0286716 A1* | 9/2014 | Cochrum | B65D 88/66 |
| | | | 406/122 |
| 2016/0130095 A1* | 5/2016 | Oren | B65G 65/40 |
| | | | 414/414 |
| 2016/0200503 A1* | 7/2016 | Zaleski, Jr. | B65D 88/128 |
| | | | 222/185.1 |
| 2016/0318707 A1* | 11/2016 | Markham | B65D 88/128 |
| 2017/0030176 A1* | 2/2017 | Stegemoeller | B65D 90/0033 |
| 2019/0256281 A1* | 8/2019 | Cochrum | B65D 88/32 |

* cited by examiner

ROLL-OFF TRANSPORT BARREL WITH GRAVITY, VACUUM, AND PNEUMATIC LOADING AND UNLOADING

BACKGROUND

Tank trailers drawn by trucks may be used to transport bulk materials, such as sand, water, oil, and other similar materials, from a source location to a destination, where the bulk materials may be put to use. Once the bulk materials are consumed, the tank trailer may be returned to the source location to be refilled and returned to the destination. It may take some time for the bulk materials delivered using the tank trailer to be completely consumed at the destination. It may be inefficient to leave the truck driver, the truck, and the tank trailer idle while the bulk materials delivered using the tank trailer are being consumed. Efficiently transporting bulk materials to a destination in a tank trailer is a challenge.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Figure 1:
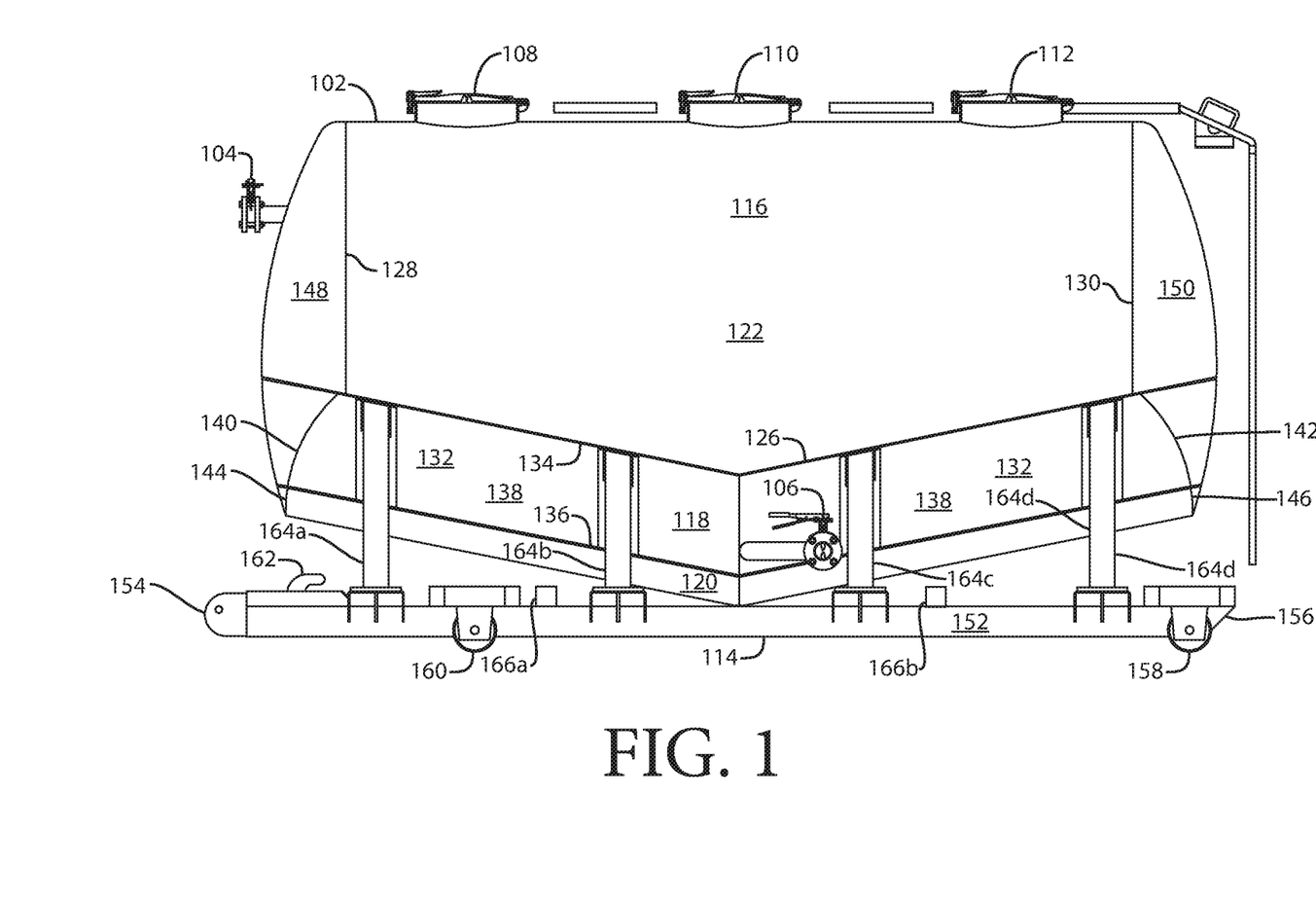
FIG. 1 is a side plan view of a transport barrel mounted on a roll-off skid.

FIG. 1 is a side plan view of a transport barrel mounted on a roll-off skid. A barrel 102 is useful for containing and transporting bulk materials, such as water and other fluids, such as fracing fluids, sand, grains, powders, gravel, or other similar materials. The barrel 102 is capable of vacuum loading and unloading. Vacuum loading is performed by pulling pressure out of the barrel 102 through vacuum/pressure valve 104 creating a negative pressure within the barrel 102. The negative pressure urges the bulk materials through vacuum loading/unloading valve 106 (or through a valve (not shown) installed in the rear of the barrel 102 opposite vacuum/pressure valve 104) into the barrel 102. Vacuum unloading is performed by applying pressure to the vacuum/pressure valve 104 creating a positive pressure within the barrel 102 while applying a vacuum to unloading valve 106. The positive pressure urges the bulk materials out of the barrel 102 and through unloading valve 106.

The barrel 102 is capable of gravity unloading and loading. The barrel 102 may be gravity loaded through manways 108, 110, and 112, and unloaded through unloading valve 302 (see FIGS. 3 and 4) or through unloading valve 106.

The barrel 102 is capable of pneumatic unloading. In one or more embodiments, pneumatic unloading is performed through valve 302 (see FIGS. 3 and 4) or through unloading valve 106. In one or more embodiments, unloading valve 106 or unloading valve 302 include fittings for a fluidization line (not shown), used to inject pressurized air into the barrel 102 to fluidize the bulk material in the barrel 102, and fittings for an unloading line (not shown), through which the bulk material in the barrel 102 is drawn using, for example, the Venturi effect.

A roll-off skid 114, described in more detail below, is coupled to the barrel.

The barrel 102 has an upper concave section 116, a middle convex section 118, and a lower trough section 120. The upper concave section 116 is a storage area for bulk materials. The middle convex section 118 is shaped to urge the bulk materials into the lower trough section 120. The lower trough section 120 funnels bulk materials toward the unloading valves 302 and 106.

Figure 2:
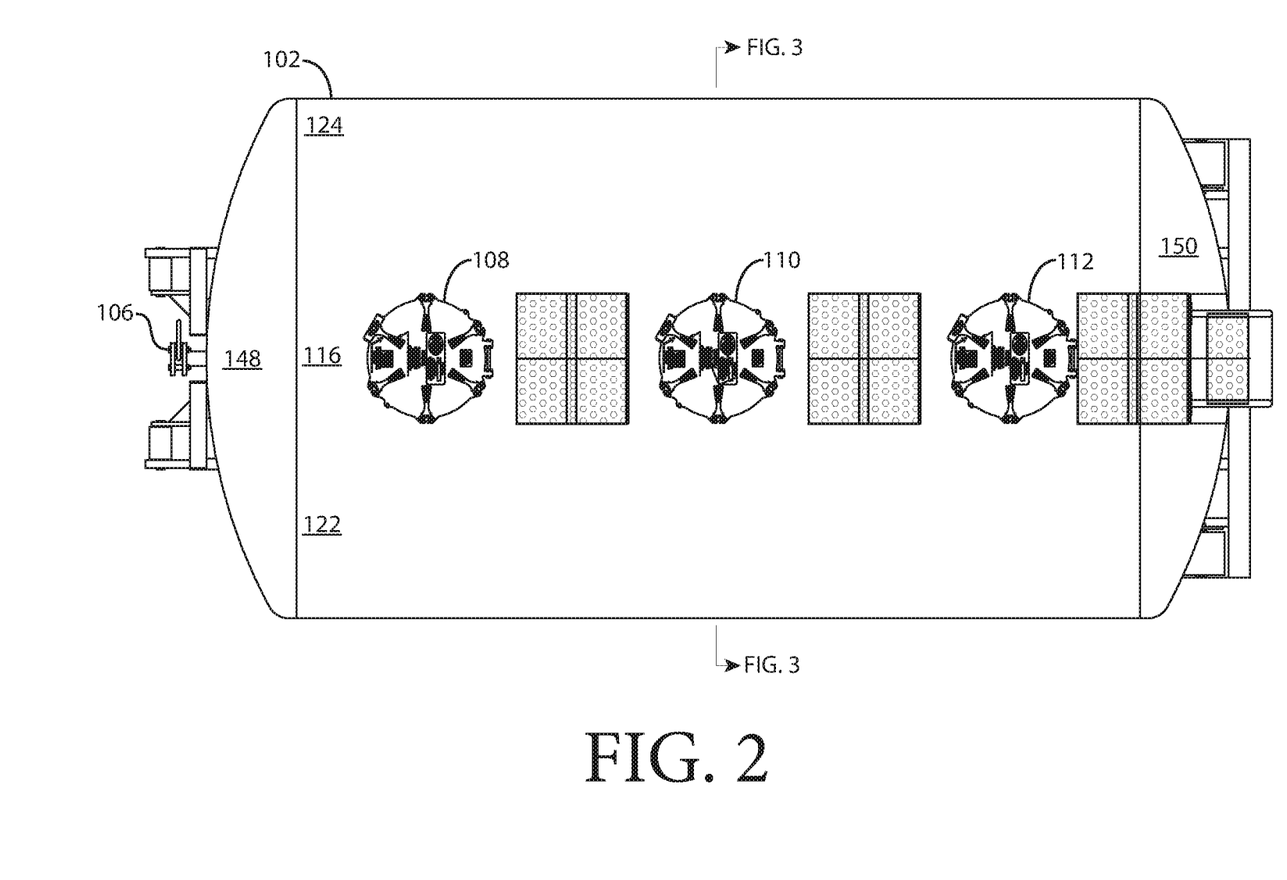
FIG. 2 is a top plan view of the transport barrel of FIG. 1.

The upper concave section 116 has a port side 122 and a starboard side 124 (visible in FIG. 2). The port side 122 of the upper concave section 116 has a port-side v-shaped edge 126. The starboard side 124 has a starboard-side v-shaped edge 127 (see FIG. 3). The upper concave section 116 has an upper concave section front edge 128 and an upper concave section rear edge 130.

Figure 3:
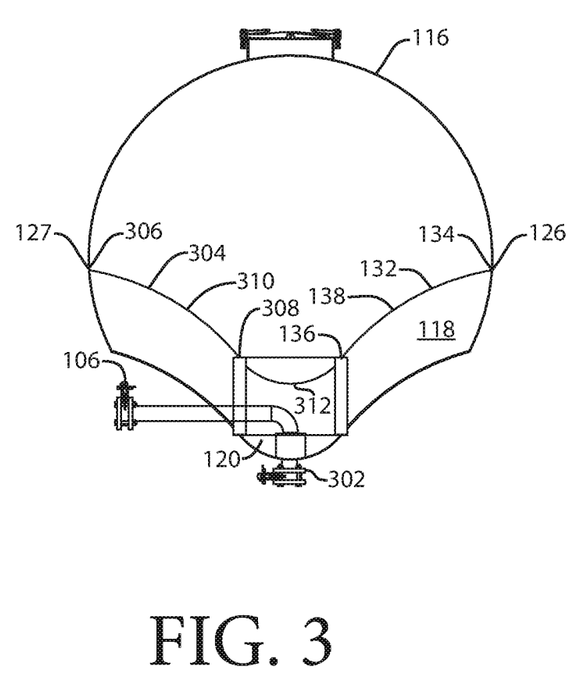
FIG. 3 is a cross-sectional view of the transport barrel of FIG. 1 along the view line shown in FIG. 2.
Figure 4:
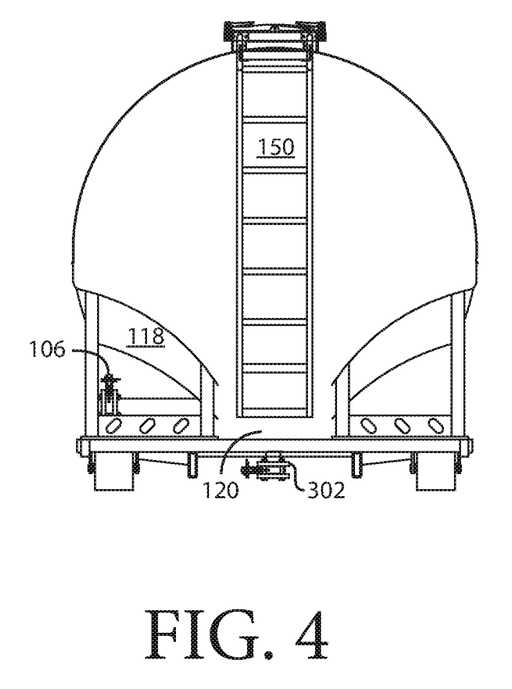
FIG. 4 is a rear plan view of the transport barrel mounted on a roll-off skid of FIG. 1.

The middle convex section 118 has a port convex baffle 132 (see FIG. 3). The port convex baffle 132 has an upper v-shaped edge 134 coupled to the port-side v-shaped edge 126 of the upper concave section 116. The port convex baffle 132 has a lower v-shaped edge 136. The port convex baffle 132 has a port convex section 138 between the upper v-shaped edge 134 and the lower v-shaped edge 136 of the port convex baffle 132.

The middle convex section 118 has a starboard convex baffle 304 (see FIG. 3). The starboard convex baffle 304 includes an upper v-shaped edge 306 coupled to the starboard-side v-shaped edge 127 of the upper concave section 116. The starboard convex baffle 304 includes a lower v-shaped edge 308. The starboard convex baffle 304 includes a starboard convex section 310 between the upper v-shaped edge 306 and the lower v-shaped edge 308 of the starboard convex baffle. The middle convex section 118 has a middle convex section front edge 140 and a middle convex section rear edge 142.

The lower trough section 120 is coupled to the lower v-shaped edge of the port convex baffle 136 and the lower v-shaped edge of the starboard convex baffle 308. The lower trough section 120 has a lower trough section front edge 144 and a lower trough section rear edge 146.

The barrel 102 includes a front cap 148 coupled to the upper concave section front edge 128, the middle convex front edge 140, and the lower trough section front edge 144. The barrel 102 includes a rear cap 150 coupled to the upper concave section rear edge 130, the middle convex rear edge 142 and the lower trough section rear edge 146.

Figure 5:
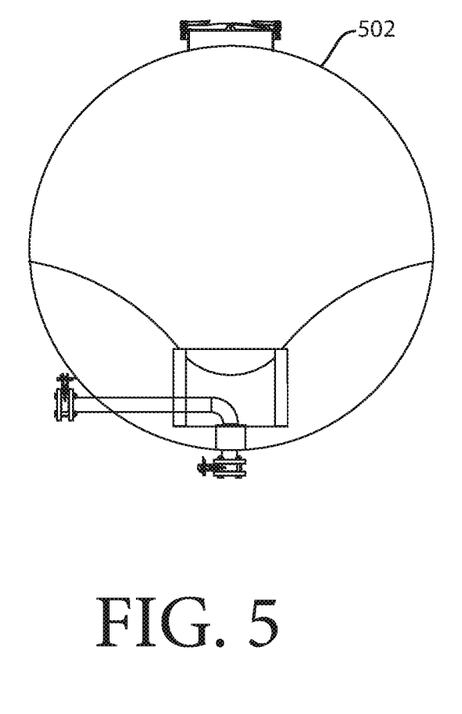
FIG. 5 is a cross-sectional view of a cylindrical transport barrel.

In one embodiment, illustrated in FIG. 5, the upper concave section 116 is extended to a full cylinder 502 that encloses the middle convex section 118 and through which the lower trough section 120 extends. In one known embodiment, the cylinder 502 is made of steel. In one or more embodiments the cylinder is made of aluminum. In one or more embodiments, the barrel 102 illustrated in FIGS. 1-4 is made of aluminum and is lighter than the embodiment illustrated in FIG. 5 because of the difference in weight between steel and aluminum and because of the lack of metal (steel or aluminum) in the upper convex section 116 adjacent to the middle convex section 118 and the lower trough section 120.

Figure 6A:
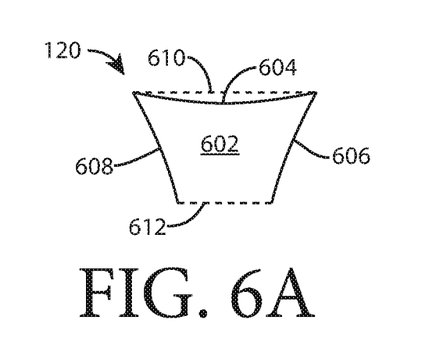
FIGS. 6A and 6B illustrate one embodiment of a lower trough section.
Figure 6B:
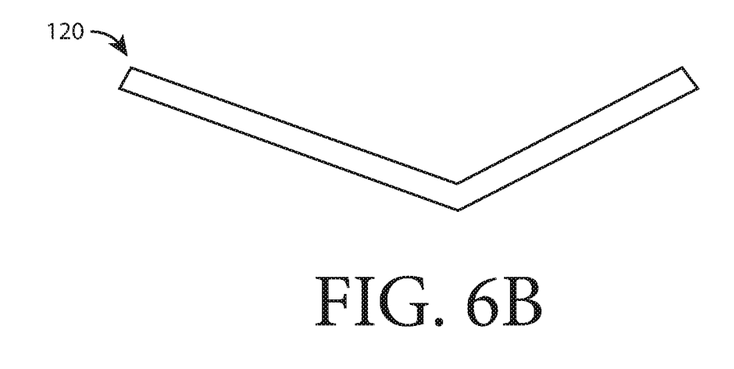

In one or more embodiments, illustrated in FIGS. 6A and 6B, the lower trough section 120 includes a funnel 602 and a permeable membrane 604. In one cross section, shown in FIG. 6A, the funnel 602 has a shape of an inverted truncated pyramid with curved sides 606, 608 having a wide opening 610 at a base of the truncated pyramid and a narrow opening 612 at a truncated plane of the truncated pyramid. The permeable membrane 604 is coupled to the wide opening 610 of the funnel 602. In another cross section illustrated in FIG. 6B, transverse to the cross-section illustrated in FIG. 6A, the lower trough section 120 has the shape of a V.

Figure 7A:
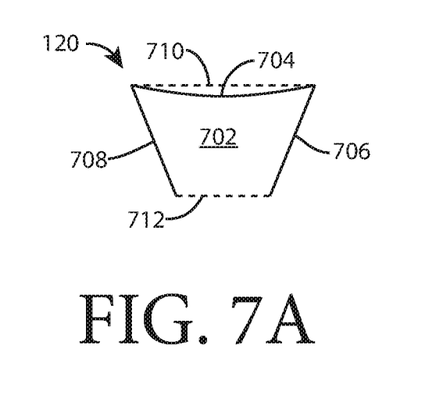
FIGS. 7A and 7B illustrate one embodiment of a lower trough section.
Figure 7B:
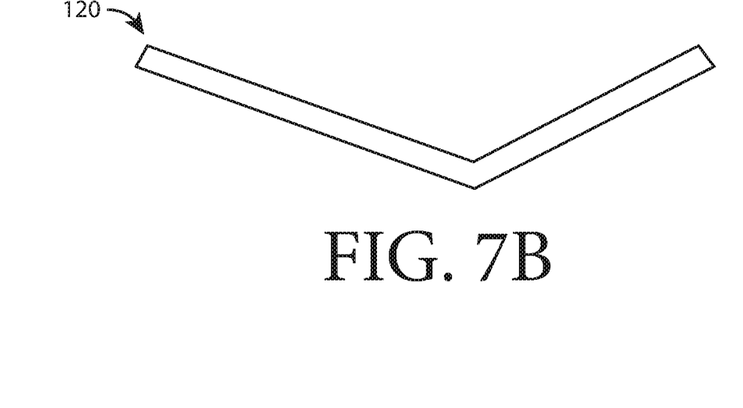

In one or more embodiments, illustrated in FIGS. 7A and 7B, the lower trough section 120 includes a funnel 702 and a permeable membrane 604. In one cross section, shown in FIG. 7A, the funnel 702 has a shape of an inverted truncated pyramid with straight sides 706, 708 having a wide opening 710 at a base of the truncated pyramid and a narrow opening 712 at a truncated plane of the truncated pyramid. The permeable membrane 704 is coupled to the wide opening 710 of the funnel 702. In another cross section illustrated in FIG. 7B, transverse to the cross-section illustrated in FIG. 7A, the lower trough section 120 has the shape of a V.

When pneumatically unloading, pressurized air is injected into the barrel 102 through the funnel 602, 702 and through the permeable membrane 604, 704 to fluidize the bulk material in the barrel 102. The fluidized bulk material flows more easily toward and out of the unloading valve 302 or the unloading valve 106. In one or more embodiments, the permeable membrane 604, 704 is a sheet of cloth or, in high temperature applications, a stainless steel mesh.

The V shape and convex shape of the middle convex section 118 and the V shape of the lower trough section 120 also enhance movement of the bulk material within the barrel 102.

Returning to FIG. 1, the roll-off skid 114 includes a port rail 152 having a front end 154 and a rear end 156. The roll-off skid 114 includes a starboard rail (not shown but very similar to the port rail 152) parallel to the port rail 152, the starboard rail having a front end (not shown) and a rear end (not shown). The roll-off skid 114 includes a plurality of beams (not shown) transverse to the port rail 152 and the starboard rail and coupling the port rail 152 to the starboard rail. The roll-off skid 114 includes a port rear wheel 158 coupled to a rear end of the port rail 152. The roll-off skid 114 includes a starboard rear wheel (not shown) coupled to a rear end (not shown) of the starboard rail. The roll-off skid 114 includes a port front wheel 160 coupled to the port rail 152 between the port rear wheel 158 and the front end 154 of the port rail 152. The roll-off skid 114 includes a starboard front wheel (not shown) coupled to the starboard rail between the starboard rear wheel and the front end of the starboard rail. The roll-off skid 114 includes a hook 162 coupled to the port rail 152 and starboard rail adjacent to the front end 154 of the port rail 152. The roll-off skid 114 includes a plurality of port posts 164a-d coupled between the port rail 152 and the barrel 102. The roll-off skid 114 includes a plurality of starboard posts (not shown) coupled between the starboard rail and the barrel. The roll-off skid 114 includes fork-lift pockets 166a, 166b.

Figure 8A:
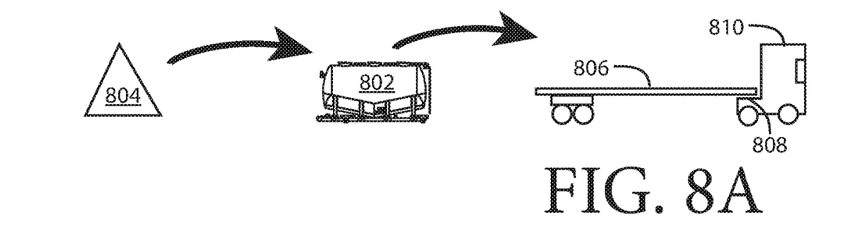
FIGS. 8A-8D illustrate an example of use of the transport barrel mounted on a roll-off skid of FIG. 1.

In one example of use, illustrated in FIG. 8A, a barrel coupled to a roll-off skid 802 is filled with a material 804, such as sand. The filled barrel and roll-off skid 802 is loaded onto a truck-drawn trailer 806 in such a way that the bridging requirements of the truck-drawn trailer 806 are satisfied. The "bridging" requirements of the truck-drawn trailer 806 are the requirements of the transfer of weight from the truck-drawn trailer 806 to a fifth wheel 808 of a truck 810 and may limit the load for the truck-drawn trailer 806 to a single full barrel coupled to a roll-off skid 802.

Figure 8B:
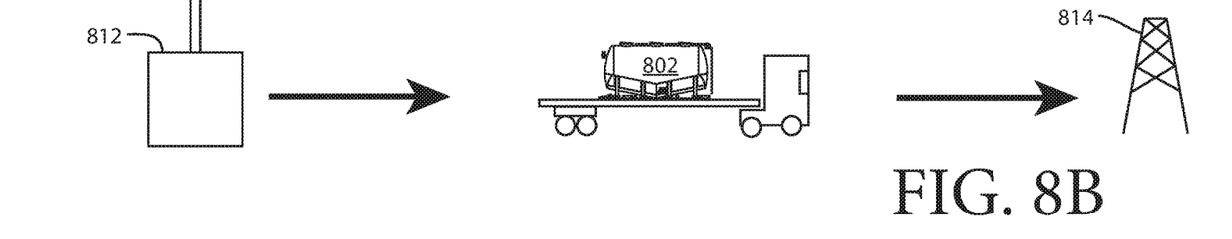
Figure 8C:
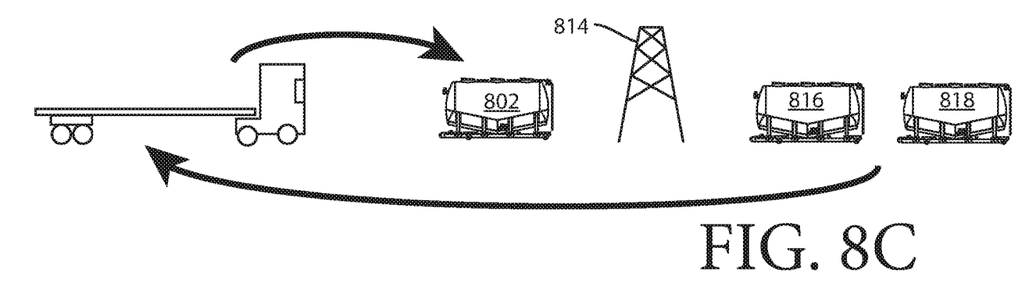
Figure 8D:
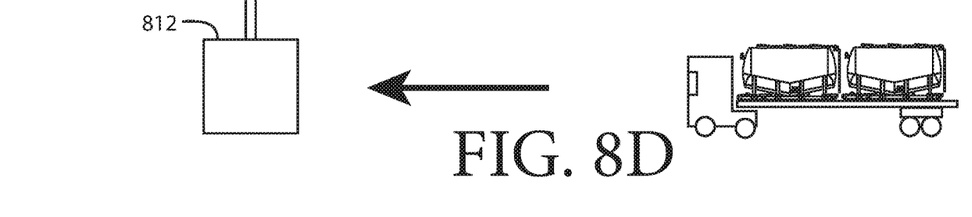

The truck-drawn trailer 806 is transported from a loading location 812 to an unloading location 814 by the truck 810, as shown in FIG. 8B. The full barrel coupled to a roll-off skid 802 is unloaded from the truck-drawn trailer 806 at the unloading location 814, as shown in FIG. 8C, where a plurality of empty barrels coupled to roll-off skids 816, 818 is waiting to be returned to the source location 812 for refilling. The plurality of empty barrels coupled to roll-off skids 816, 818 is loaded onto the truck-drawn trailer 806. In one or more embodiments, because the plurality of empty barrels coupled to roll-off skids 816, 818 is empty, they can be loaded on the truck-drawn trailer 806 without violating the bridging requirements of the truck-drawn trailer 806. The empty barrels coupled to roll-off skids 816, 818 are returned to the loading location 812, as shown in FIG. 8D.

In one aspect, an apparatus includes a barrel capable of vacuum loading and unloading, gravity unloading and loading, and pneumatic unloading. A roll-off skid is coupled to the barrel.

Implementations may include one or more of the following. The barrel may include an upper concave section. The upper concave section may have a port side having a port-side v-shaped edge, a starboard side having a starboard-side v-shaped edge, an upper concave section front edge, and an upper concave section rear edge. The barrel may include a middle convex section. The middle convex section may have a port convex baffle. The port convex baffle may have an upper v-shaped edge coupled to the port-side v-shaped edge of the upper concave section, a lower v-shaped edge, and a port convex section between the upper v-shaped edge and the lower v-shaped edge of the port convex baffle. The middle convex section may have a starboard convex baffle. The starboard convex baffle may have an upper v-shaped edge coupled to the starboard-side v-shaped edge of the upper concave section, a lower v-shaped edge, and a starboard convex section between the upper v-shaped edge and the lower v-shaped edge of the starboard convex baffle. The middle convex section may have a middle convex section front edge, and a middle convex section rear edge. The barrel may include a lower trough section coupled to the lower v-shaped edge of the port convex baffle and the lower v-shaped edge of the starboard convex baffle. The lower trough section may have a lower trough section front edge and a lower trough section rear edge. The barrel may have a front cap coupled to the upper concave section front edge, the middle convex front edge and the lower trough section front edge. The barrel may have a rear cap coupled to the upper concave section rear edge, the middle convex rear edge and the lower trough section rear edge. The barrel may have a plurality of openings. The apparatus may have an outer shell that encloses the upper concave section and the middle convex section and through which the lower trough section extends. The lower trough section may have a funnel. The funnel may have in one cross section, a shape of an inverted truncated pyramid with curved sides and having a wide opening at a base of the truncated pyramid and a narrow opening at a truncated plane of the truncated pyramid, and in another cross section, the shape of a V. The funnel may include a permeable membrane, such as a cloth mesh or, for higher t coupled to the wide opening of the upper portion. The funnel may have in one cross section, a shape of an inverted truncated pyramid with straight sides and having a wide opening at a base of the truncated pyramid and a narrow opening at a truncated plane of the truncated pyramid, and in another cross section, the shape of a V. The openings may include a pneumatic port into the lower trough section, a vacuum port into the upper concave section, and a gravity feed port into the upper concave section. The roll-off skid may include a port rail having a front end and a rear end. The roll-off skid may include a starboard rail parallel to the port rail, the starboard rail having a front end and a rear end. The roll-off skid may include a plurality of beams transverse to the port rail and the starboard rail and coupling the port rail to the starboard rail. The roll-off skid may include a port rear wheel coupled to a rear end of the port rail. The roll-off skid may include a starboard rear wheel coupled to a rear end of the starboard rail. The roll-off skid may include a port front wheel coupled to the port rail between the port rear wheel and the front end of the port rail. The roll-off skid may include a starboard front wheel coupled to the starboard rail between the starboard rear wheel and the front end of the starboard rail. The roll-off skid may include a hook coupled to the port rail and the starboard rail adjacent to the front end of the port rail and the starboard rail. The roll-off skid may include a plurality of port posts coupled between the port rail and the barrel. The roll-off skid may include a plurality of starboard posts coupled between the starboard rail and the barrel.

In one aspect, an apparatus includes a barrel. The barrel includes an upper concave section. The upper concave section has a port side having a port-side v-shaped edge, a starboard side having a starboard-side v-shaped edge, an upper concave section front edge, and an upper concave section rear edge. The barrel includes a middle convex section. The middle convex section has a port convex baffle. The port convex baffle has an upper v-shaped edge coupled to the port-side v-shaped edge of the upper concave section, a lower v-shaped edge, and a port convex section between the upper v-shaped edge and the lower v-shaped edge of the port convex baffle. The middle convex section has a starboard convex baffle. The starboard convex baffle has an upper v-shaped edge coupled to the starboard-side v-shaped edge of the upper concave section, a lower v-shaped edge, and a starboard convex section between the upper v-shaped edge and the lower v-shaped edge of the starboard convex baffle. The middle convex section has a middle convex section front edge, and a middle convex section rear edge. The barrel has a lower trough section coupled to the lower v-shaped edge of the port convex baffle and the lower v-shaped edge of the starboard convex baffle. The lower trough section has a lower trough section front edge and a lower trough section rear edge. The barrel has a front cap coupled to the upper concave section front edge, the middle convex front edge and the lower trough section front edge. The barrel has a rear cap coupled to the upper concave section rear edge, the middle convex rear edge and the lower trough section rear edge. The barrel has a plurality of openings.

In one aspect, a method includes filling a barrel coupled to a roll-off skid with a material. The method includes loading the filled barrel onto a truck-drawn trailer. The method includes transporting the truck-drawn trailer from a loading location to an unloading location. The method includes unloading the barrel from the truck-drawn trailer. The method includes loading a plurality of empty barrels coupled to roll-off skids onto the truck-drawn trailer. The method includes returning to the loading location with the empty barrels.

Implementations may include one or more of the following. The truck-drawn trailer may be a tilt-up trailer. Unloading the barrel from the truck-drawn trailer may include tilting up the tilt-up trailer. Filling the barrel with material may include pneumatically filling the barrel. The method may include pneumatically unloading the barrel. Filling the barrel with material may include vacuum filling the barrel. The method may include vacuum unloading the barrel. Filling the barrel with material may include gravity filling the barrel. The method may include gravity unloading the barrel.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:
1. An apparatus comprising:
 a barrel capable of vacuum loading and unloading, gravity unloading and loading, and pneumatic unloading; and
 a roll-off skid coupled to the barrel;
 wherein the barrel comprises:
 an upper concave section having:
  a port side having a port-side v-shaped edge,
  a starboard side having a starboard-side v-shaped edge,
  an upper concave section front edge, and
  an upper concave section rear edge;
 a middle convex section having:
  a port convex baffle having:
   an upper v-shaped edge coupled to the port-side v-shaped edge of the upper concave section,
   a lower v-shaped edge, and
   a port convex section between the upper v-shaped edge and the lower v-shaped edge of the port convex baffle,
  a starboard convex baffle having:
   an upper v-shaped edge coupled to the starboard-side v-shaped edge of the upper concave section,
   a lower v-shaped edge, and a starboard convex section between the upper v-shaped edge and the lower v-shaped edge of the starboard convex baffle,
a middle convex section front edge, and a middle convex section rear edge,
a lower trough section coupled to the lower v-shaped edge of the port convex baffle and the lower v-shaped edge of the starboard convex baffle and having a lower trough section front edge and a lower trough section rear edge;
a front cap coupled to the upper concave section front edge, the middle convex front edge and the lower trough section front edge;
a rear cap coupled to the upper concave section rear edge, the middle convex rear edge and the lower trough section rear edge; and
a plurality of openings.

2. The apparatus of claim 1 comprising an outer shell that encloses the upper concave section and the middle convex section and through which the lower trough section extends.

3. The apparatus of claim 1 wherein the lower trough section comprises:
a funnel having:
in one cross section, a shape of an inverted truncated pyramid with curved sides and having a wide opening at a base of the truncated pyramid and a narrow opening at a truncated plane of the truncated pyramid, and
in another cross section, the shape of a V, and a permeable membrane coupled to the wide opening of the upper portion.

4. The apparatus of claim 1 wherein the lower trough section comprises:
an upper portion having:
in one cross section, a shape of an inverted truncated pyramid and having a wide opening at a base of the truncated pyramid and a narrow opening at a truncated plane of the truncated pyramid, and
in another cross section, the shape of a V, and
a permeable membrane coupled to the wide opening of the upper portion.

5. The apparatus of claim 1 wherein the openings comprise:
a pneumatic port into the lower trough section;
a vacuum port into the upper concave section; and
a gravity feed port into the upper concave section.

6. The apparatus of claim 1 wherein the roll-off skid comprises:
a port rail having a front end and a rear end;
a starboard rail parallel to the port rail, the starboard rail having a front end and a rear end;
a plurality of beams transverse to the port rail and the starboard rail and coupling the port rail to the starboard rail;
a port rear wheel coupled to a rear end of the port rail;
a starboard rear wheel coupled to a rear end of the starboard rail;
a port front wheel coupled to the port rail between the port rear wheel and the front end of the port rail;
a starboard front wheel coupled to the starboard rail between the starboard rear wheel and the front end of the starboard rail;
a plurality of port posts coupled between the port rail and the barrel; and
a plurality of starboard posts coupled between the starboard rail and the barrel.

7. An apparatus comprising:
a barrel having:
an upper concave section having:
a port side having a port-side v-shaped edge,
a starboard side having a starboard-side v-shaped edge,
an upper concave section front edge, and
an upper concave section rear edge,
a middle convex section having:
a port convex baffle having:
an upper v-shaped edge coupled to the port-side v-shaped edge of the upper concave section,
a lower v-shaped edge, and
a port convex section between the upper v-shaped edge and the lower v-shaped edge of the port convex baffle,
a starboard convex baffle having:
an upper v-shaped edge coupled to the starboard-side v-shaped edge of the upper concave section,
a lower v-shaped edge, and
a starboard convex section between the upper v-shaped edge and the lower v-shaped edge of the starboard convex baffle,
a middle convex section front edge, and
a middle convex section rear edge,
a lower trough section coupled to the lower v-shaped edge of the port convex baffle and the lower v-shaped edge of the starboard convex baffle and having a lower trough section front edge and a lower trough section rear edge,
a front cap coupled to the upper concave section front edge, the middle convex front edge and the lower trough section front edge,
a rear cap coupled to the upper concave section rear edge, the middle convex rear edge and the lower trough section rear edge,
a plurality of openings; and
a roll-off skid coupled to the barrel.

8. The apparatus of claim 7 comprising an outer shell that encloses the upper concave section and the middle convex section and through which the lower trough section extends.

9. The apparatus of claim 7 wherein the lower trough section comprises:
a funnel having:
in one cross section, a shape of an inverted truncated pyramid with curved sides and having a wide opening at a base of the truncated pyramid and a narrow opening at a truncated plane of the truncated pyramid, and
in another cross section, the shape of a V, and
a permeable membrane coupled to the wide opening of the upper portion.

10. The apparatus of claim 7 wherein the lower trough section comprises:
an upper portion having:
in one cross section, a shape of an inverted truncated pyramid and having a wide opening at a base of the truncated pyramid and a narrow opening at a truncated plane of the truncated pyramid, and
in another cross section, the shape of a V, and
a permeable membrane coupled to the wide opening of the upper portion.

11. The apparatus of claim 7 wherein the roll-off skid comprises:
a port rail having a front end and a rear end;
a starboard rail parallel to the port rail, the starboard rail having a front end and a rear end;
a plurality of beams transverse to the port rail and the starboard rail and coupling the port rail to the starboard rail;

a port rear wheel coupled to a rear end of the port rail;
a starboard rear wheel coupled to a rear end of the starboard rail;
a port front wheel coupled to the port rail between the port rear wheel and the front end of the port rail;
a starboard front wheel coupled to the starboard rail between the starboard rear wheel and the front end of the starboard rail;
a plurality of port posts coupled between the port rail and the barrel; and
a plurality of starboard posts coupled between the starboard rail and the barrel.

12. The apparatus of claim 7 wherein the openings comprise:
a pneumatic port into the lower trough section;
a vacuum port into the upper concave section; and
a gravity feed port into the upper concave section.

* * * * *